(12) United States Patent
Lion et al.

(10) Patent No.: US 7,984,885 B2
(45) Date of Patent: Jul. 26, 2011

(54) MULTI-PURPOSE TRIVETS (75) Inventors: Mathieu Lion, Paris (FR); Elodie Brisset, Paris (FR)

(73) Assignee: Mastrad, S.A., Paris (FR)

( * ) Notice: Subject to any disclaimer, the term of this patent is extended or adjusted under 35 U.S.C. 154(b) by 802 days.

(21) Appl. No.: 12/017,806

(22) Filed: Jan. 22, 2008

(65) Prior Publication Data

US 2009/0184228 A1 Jul. 23, 2009

(51) Int. Cl.
*F16M 11/00* (2006.01)

(52) U.S. Cl. ............................ 248/176.2; 248/346.01

(58) Field of Classification Search .............. 248/176.2, 248/346.01, 346.03, 346.11; 428/174; D7/388; D34/38
See application file for complete search history.

(56) References Cited

U.S. PATENT DOCUMENTS

| D7,527 S | 7/1874 | Palmer |
| D30,175 S | 2/1899 | Wagner |
| D71,092 S | 9/1926 | Wentorf |
| 4,550,894 A | 11/1985 | Barlies .................... 248/346 |
| 4,858,872 A | 8/1989 | Witt ...................... 248/346.1 |
| D371,276 S | 7/1996 | Laib .................... D7/388 |
| 6,045,106 A | 4/2000 | Henley .................. 248/346.3 |
| D508,368 S | 8/2005 | Lion et al. ................ D7/388 |
| D517,743 S | 3/2006 | Perrin .................... D29/119 |
| 7,048,243 B1 | 5/2006 | Steinman .............. 248/346.01 |
| D541,486 S | 4/2007 | Mahaffey .............. D29/119 |
| 7,625,625 B2* | 12/2009 | Rios et al. .................. 428/141 |
| 2005/0056642 A1 | 3/2005 | Lion ..................... 220/4.22 |
| 2005/0255772 A1 | 11/2005 | Fung ..................... 442/168 |
| 2005/0278827 A1 | 12/2005 | Price et al. .................. 2/158 |
| 2006/0000368 A1 | 1/2006 | Lion et al. ................ 99/426 |
| 2006/0080757 A1 | 4/2006 | Beyda ..................... 2/164 |
| 2006/0260473 A1* | 11/2006 | Nybakke et al. ........... 99/422 |
| 2007/0003739 A1 | 1/2007 | Peterson ................. 428/174 |
| 2007/0148409 A1 | 6/2007 | Rios et al. ............... 428/167 |
| 2007/0254134 A1 | 11/2007 | Han ...................... 428/120 |
| 2009/0162651 A1* | 6/2009 | Rios et al. ............... 428/354 |
| 2010/0183814 A1* | 7/2010 | Rios et al. ............... 427/387 |

OTHER PUBLICATIONS

Lékué Bito, Salvamantel Bito 20×19 cm, with translation—(machine translation of the text was obtained from http://www.google.com/language_tools?hl=en.
Silicate design of Phillippe Daney "Repose-plat" with translation.

* cited by examiner

*Primary Examiner* — Ramon O Ramirez
(74) *Attorney, Agent, or Firm* — Connolly Bove Lodge & Hutz LLP (57) ABSTRACT

A multi-purpose trivet comprising a base and at least one insulating pad removably coupled to the base. The base comprises a support surface and optionally a peripheral wall, wherein the peripheral wall elevates the base to define an air space. The at least one insulating pad is removably coupled to the base and is adapted to be separately used for gripping and handling hot objects having a temperature of up to 580° F. when removed from the rigid base.

24 Claims, 8 Drawing Sheets

MULTI-PURPOSE TRIVETS

BACKGROUND OF THE INVENTION

1. Field of the Invention

The present invention relates to trivets, and in particular, to multi-purpose trivets which provide support for hot objects and which also provide insulating pads for gripping and handling hot objects.

2. Description of Related Art

Trivets are commonly used in the kitchen and are objects, generally small plates or stands, placed under a hot object to protect the table or counter top surface from heat damage. Originally, trivets were made of metal or wood and often had legs to support a hot pot or dish above the table surface. Modern trivets, however, are constructed of a variety of materials, such as metal, wood, ceramic, fabric, or silicone.

The safe handling, transportation and storage of hot objects are particular concerns in cooking, as there is an ever present risk of injury from burns or scalding from such hot objects. While numerous different kitchen implements have been developed to assist in those tasks, such as pot holders, trivets, cooling racks or trays, pot handle covers, and the like, it is often difficult to have all of these implements handy and in a single place for use when they are needed.

Thus, it would be desirable to have a multi-purpose implement that is suitable for use in the kitchen and that provides support for the transportation and storage of hot objects and which also provides insulating pads for gripping and handling hot objects.

SUMMARY

The embodiments of the multi-purpose trivets disclosed herein are suitable for any application and, in particular, in cooking applications which require the transportation, handling and storage of hot objects, such as pots and pans. Among the advantages provided by the multi-purpose trivets are portability, storage and accessibility in a single device of the various different implements which are required when working with and handling hot objects. Moreover, because the multi-purpose trivets include a rigid component and components which are removably attached or interlocked together, the multi-purpose trivets may be stored or carried in any orientation, i.e., both horizontally or vertically.

In one preferred embodiment, the multi-purpose trivet comprises a base comprising a support surface and an insulating pad removably coupled to the base. The insulating pad is removably coupled to the base and adapted to be separately used in gripping and handling hot objects having temperature of up to about 580° F. when the insulating pad is removed from the base.

In accordance with one aspect of the preferred embodiment, the support surface comprises a plurality of ridges for providing an air space for cooling. The insulating pad may also be flexible and may be made of any heat-resistant material, such as silicone. In accordance with another aspect of the preferred embodiment, the base is rigid. When the rigid base and the insulating pad are assembled together, a trivet or a tray is provided upon which a hot object may be stored or transported, The base may further comprise a peripheral wall elevating the base to define an air space. The peripheral wall of the base provides a surface for the user's hand to grip the multi-purpose trivet alone or when transporting a hot object that is placed on top of the multi-purpose trivet. The peripheral wall may also provide an air space for improved insulation of the hot object. Gaps in the peripheral wall may be provided to permit air circulation to and from the air space. When the base and the insulating pad are separated from one another, the base may still be used as a trivet or tray and the insulating pad may be separately used as a pot holder to handle and carry hot objects. A plurality or ridges may be provided by the insulating pad to provide an improved grip when handling hot objects.

In accordance with one aspect of the preferred embodiment, the base is made substantially of silicone and further comprises a reinforcement material embedded within the base. The reinforcement material may be any one a combination selected from the group consisting of wood, high shore silicone, metal, thermoplastic material (i.e., nylon, polycarbonate), thermoset, composite compounds, ceramic, glass, high temperature nylon (Zytel®), and liquid crystal polymer resins (Zenite®). The reinforcement material may be a reinforcement layer that is provided throughout a portion of the base or throughout the entirety of the base.

In accordance with another aspect of the preferred embodiment, the base is made substantially or entirely of rigid material. In accordance with this embodiment, the base may be comprised of any one or a combination of the following: wood, high shore silicone, metal, thermoplastic material (i.e., nylon, polycarbonate), thermoset, composite compounds, ceramic, glass, high temperature nylon (Zytel®), and liquid crystal polymer resins (Zenite®).

In accordance with a further aspect of the preferred embodiment, the base and the insulating pad are removably coupled together by any one or a combination of one or more suction cups, magnets, Velcro® and mating engagement elements affixed to the base, the insulating pad, or both. One or more notches may be provided on the insulating pad or the base to facilitate the removal of the insulating pad from the base.

In accordance with yet a further aspect of the preferred embodiment, the base and insulating pad are removably coupled together by mating surfaces comprising either a convex periphery about the insulating pad and a concave receiving area disposed in the base or a concave periphery about the insulating pad with a convex receiving area disposed in the base.

In accordance with yet a further aspect of the preferred embodiment, the multi-purpose trivet comprises at least one light emitting diode (LED). The at least one LED may be disposed on the base or on the insulating pad.

In another preferred embodiment, the multi-purpose trivet comprises a rigid base and at least one insulating pad adapted to be removably coupled to the rigid base. The rigid base comprises a support surface and a peripheral rim comprising a plurality of spaced apart side walls. The plurality of spaced apart walls is designed to provide air circulation and therefore increased insulation by the trivet when a hot object is placed on top of the trivet.

In accordance with one aspect of the preferred embodiment, the support surface and the at least one insulating pad comprises matching ridged patterns adapted to securely and removably couple together the rigid base and the at least one insulating pad. While the number of insulating pads provided with the multi-purpose trivet is not critical, the multi-purpose trivet may comprise two insulating pads of different sizes, wherein the smaller of the two insulating pads is configured to nest with the larger of the two insulating pads. The support surface may be recessed from the peripheral rim and shaped to fit the nested insulated pads. The two insulating pads may each further comprise notches to facilitate removal of the flexible insulating pads from each other and from the rigid base. In accordance with another aspect of the preferred embodiment, at least one of the two insulating pads may be rigid. In accordance with yet another aspect of the preferred embodiment, at least one of the two insulating pads may be flexible.

In accordance with a further aspect of the preferred embodiment, the multi-purpose trivet may further comprise at least one LED. The at least one LED may be disposed on the rigid base along the peripheral rim. The at least one LED may also be disposed on the at least one insulating pad.

In a further embodiment, the multi-purpose trivet comprises a rigid base, an intermediate insulating pad, and a flexible upper insulating pad. The rigid base, the intermediate insulating pad, and the flexible upper insulating pad are removably coupled together to support hot objects and the intermediate insulating pad and the flexible upper insulating pad are adapted to be separately used in gripping and handling hot objects when removed from the rigid base. The rigid base may also be used to support hot objects, with or without the intermediate insulating pad and the flexible upper insulating pad.

The rigid base comprises a recessed support surface and a peripheral rim comprising a plurality of spaced apart side walls. The peripheral rim and the plurality of spaced apart side walls define an air space surrounding the support cavity. The intermediate insulating pad comprises a recessed area and is configured to fit within the recessed support surface of the rigid base. The flexible upper insulating pad configured to fit within the recessed area of the intermediate insulating pad. The intermediate insulating pad and the upper insulating pad may have symmetrical or asymmetrically rounded shapes.

In accordance with one aspect of the preferred embodiment, the rigid base is made substantially of silicone and further comprises a reinforcement material, such as reinforced nylon, embedded within the rigid base. In accordance with another aspect of the preferred embodiment, the rigid base is made of ceramic.

In accordance with another aspect of the preferred embodiment, the intermediate insulating pad and the flexible upper insulating pad are each made substantially of flexible heat resistant rubber, silicone, high heat thermoplastic vulcanized rubber (TVR), or a combination thereof. The intermediate insulating pad and the flexible upper insulating pad may each further comprise notches to facilitate removal from each other and from the rigid base.

In accordance with a further aspect of the preferred embodiment, the intermediate insulating pad is made substantially of a rigid material.

In accordance with yet a further aspect of the preferred embodiment, the multi-purpose trivet further comprises at least on LED. The at least one LED may be disposed on the rigid base, particularly on the peripheral rim. The LED may also be disposed on one or both of the intermediate insulating pad and the flexible upper pad.

Other objects, features and advantages of the present invention will become apparent to those skilled in the art from the following detailed description.

BRIEF DESCRIPTION OF THE DRAWINGS

Like numerals refer to like parts throughout the several views of the drawings.

DETAILED DESCRIPTION OF EMBODIMENTS OF THE INVENTION

The multi-purpose trivets disclosed herein provide support for storage and transportation of hot objects and also provides insulating pads for gripping and handling hot objects when removed from the support. The support may be a flat and flexible base, a base having ridges to provide air space underneath the support for cooling, or a rigid base having a peripheral wall to elevate the multi-purpose trivet to provide a larger air space for cooling. While any number of insulating pads may be provided with the multi-purpose trivets, one preferred embodiment is described herein has comprising two insulating pads nested within a rigid base.

Figure 1:
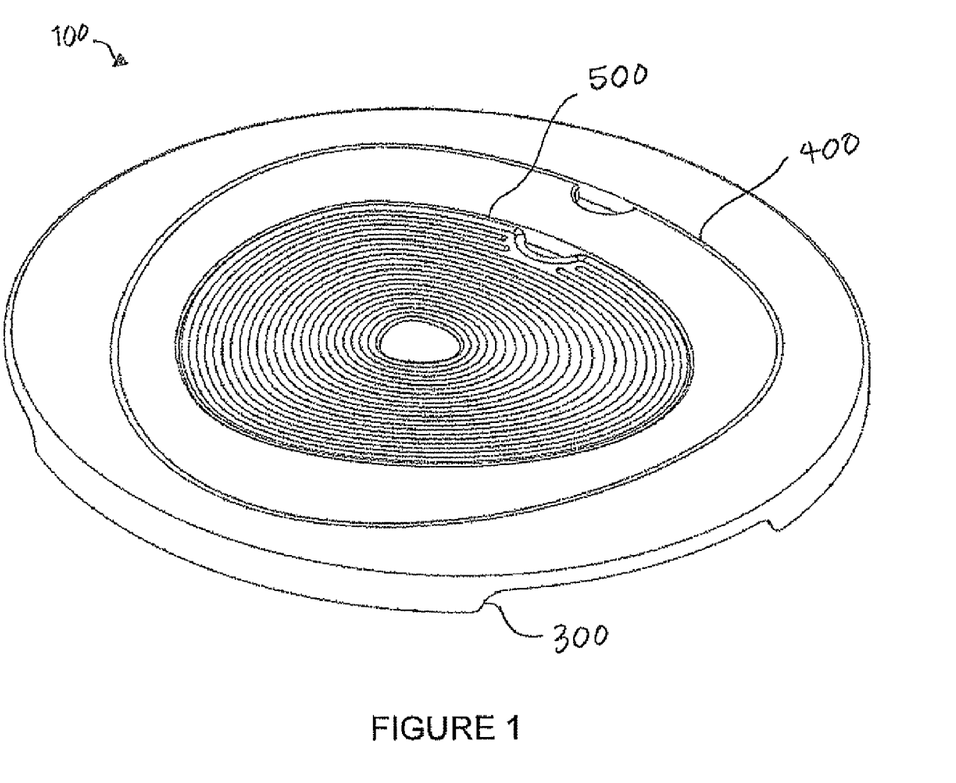
FIG. 1 is a perspective view of a multi-purpose trivet in accordance with one embodiment.

Referring now to FIG. 1, an embodiment of a fully assembled multi-purpose trivet (100) is depicted. In this embodiment, the multi-purpose trivet comprises a rigid base (300), an intermediate insulating pad (400) and a flexible upper insulating pad (500). As can be seen in FIG. 1, the flexible upper insulating pad (500) is nested within the intermediate insulating pad (400) which is nested within the rigid base (300). Hot objects, such as pots, pans, and dishes may be placed on top of the trivet (100) so as to prevent heat damage to the underlying surface.

Figure 2:
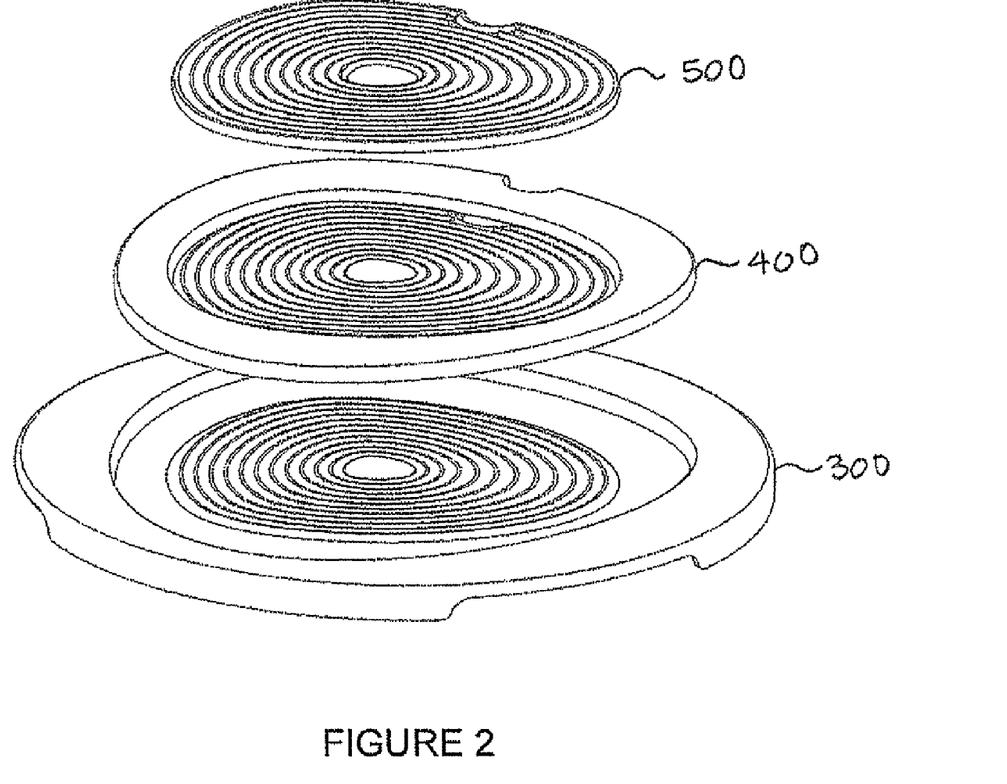
FIG. 2 is an exploded view of the multi-purpose trivet shown in FIG. 1 showing the arrangement of the rigid base, intermediate insulating pad and upper insulating pad.

FIG. 2 is an exploded view of the multi-purpose trivet shown in FIG. 1 and depicts the arrangement of the individual rigid base (300), intermediate insulating pad (400), and the upper insulating pad (500). As can be seen in FIG. 2, each of the three components is asymmetrically shaped and the rigid base (300) includes a recessed area (416) to accommodate the intermediate insulating pad (400) which, in turn, includes a recessed surface to accommodate the upper insulating pad (500). The ridged patterns provided on each of the three components are complementary so as to enable the removable coupling or nesting of the components together. Each of the three components of the multi-purpose trivet is depicted and discussed in further detail in FIGS. 3-5.

Figure 3A:
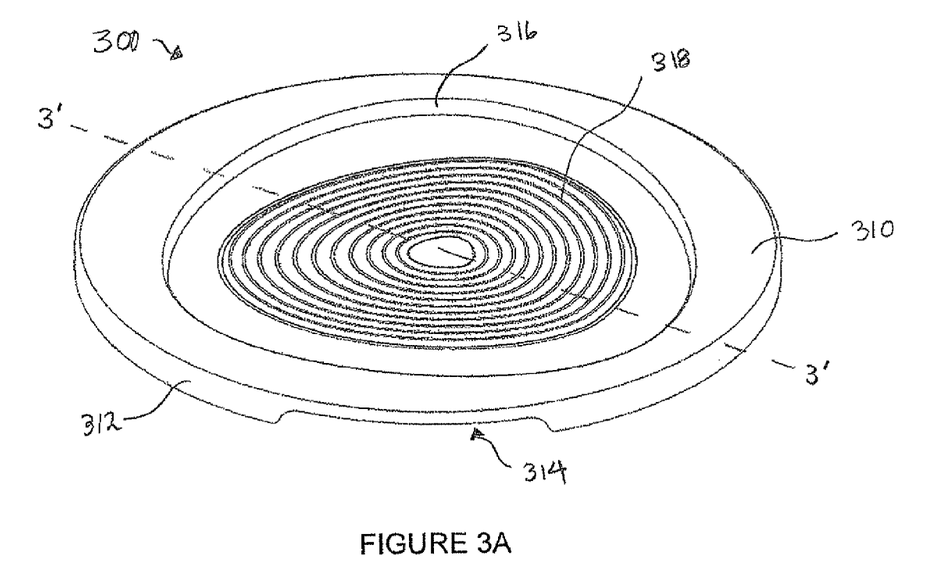
FIG. 3A is a front perspective view of the rigid base.
Figure 3B:
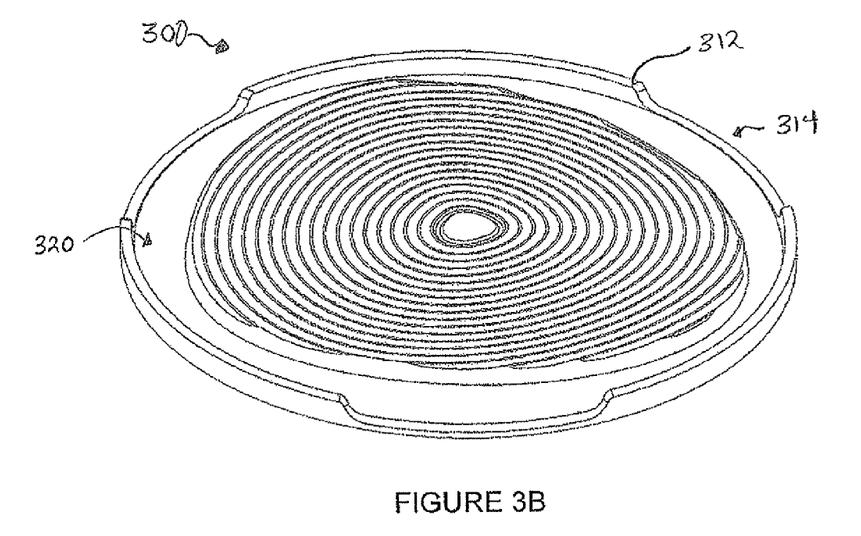
FIG. 3B is a rear perspective view of the rigid base.

FIGS. 3A-B depict an embodiment of the rigid base (300). The rigid base (300) is depicted as comprising a recessed support surface (316) comprising a ridged pattern (318) and a peripheral rim (310) surrounding the recessed support surface (316). The peripheral rim (310) further comprises peripheral side walls (312) and air gaps (314) in between the peripheral side walls (312). As can be seen in FIG. 3B, an air space (320) is defined by the peripheral rim (310) surrounding the recessed support surface (316). Cooler air is allowed to circulate in and out of the air space (320) through the air gaps (314). The ridged pattern (318), the air space (320) and the air gaps (314) are designed to provide improved insulation of hot objects placed on top of the multi-purpose trivet (300) by providing air circulation around the hot object.

Figure 3C:
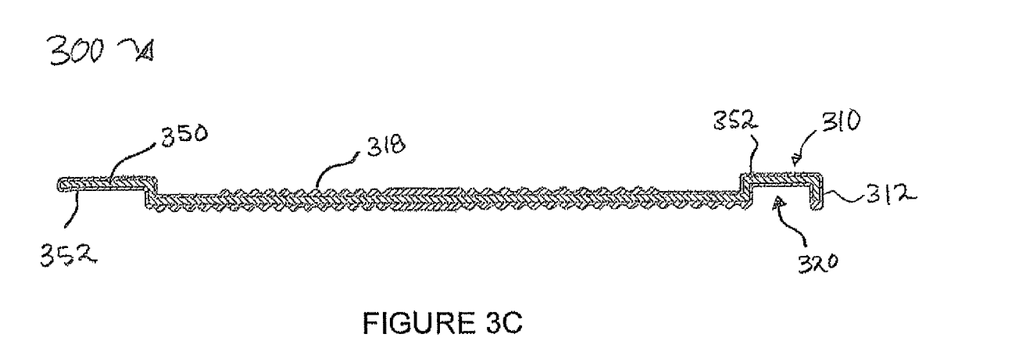
FIG. 3C is a cross-sectional view of the rigid base taken along 3'-3' in FIG. 3A.

FIG. 3C is a cross-sectional view of the rigid base taken along 3'-3' in FIG. 3A comprising the peripheral rim (310), the peripheral side wall (312), the air gap (320), and the recessed support structure (316) including the ridged pattern (318). In one embodiment, the rigid base is made substantially of silicone. Silicone has a number of desirable qualities for cooking. It has a nonstick finish, does not retain odors or flavors, is stain resistant, dishwasher safe, and can withstand temperature extremes, and is quick cooling, among other things. Because silicone, however, is typically a very flexible material, reinforcement material (350) may be embedded within the silicone material so as to impart rigidity to the rigid base (300). This provides the advantage of being able to provide a multi-purpose trivet and tray that is made substantially of silicone. This improved rigidity allows the proper positioning and fit of the components.

The reinforcement material may be provided as a layer of material embedded through at least a portion of or throughout the entirety of the rigid base (300). For example, the reinforcement material may be embedded in the peripheral rim (310) and peripheral side walls (312) only or, as depicted in FIG. 3C, the reinforcement material (350) may be embedded throughout the entirety of the peripheral rim (310), peripheral side walls (312) and the recessed support structure (316) of the rigid base (300).

The reinforcement material (350) may be made of any material, such as wood, high shore silicone, metal, thermoplastic material (i.e., nylon, polycarbonate), thermoset, composite compounds, ceramic, glass, high temperature nylon (Zytel®), and liquid crystal polymer resins (Zenite®), or any combination of the foregoing. The choice of material is not critical, so long as it imparts sufficient rigidity to support an average sized pot or pan (that is filled to capacity, approximately 10 to 15 pounds) and also enough heat resistance. In the embodiment depicted in FIG. 3C, a layer of reinforced nylon is depicted as the reinforcement material (350) that is sandwiched between the silicone layers (352). It is understood that the rigid base is not limited to such material and may be constructed of any heat resistant material which also imparts rigidity and structure to the base, such as ceramic.

Figure 4A:
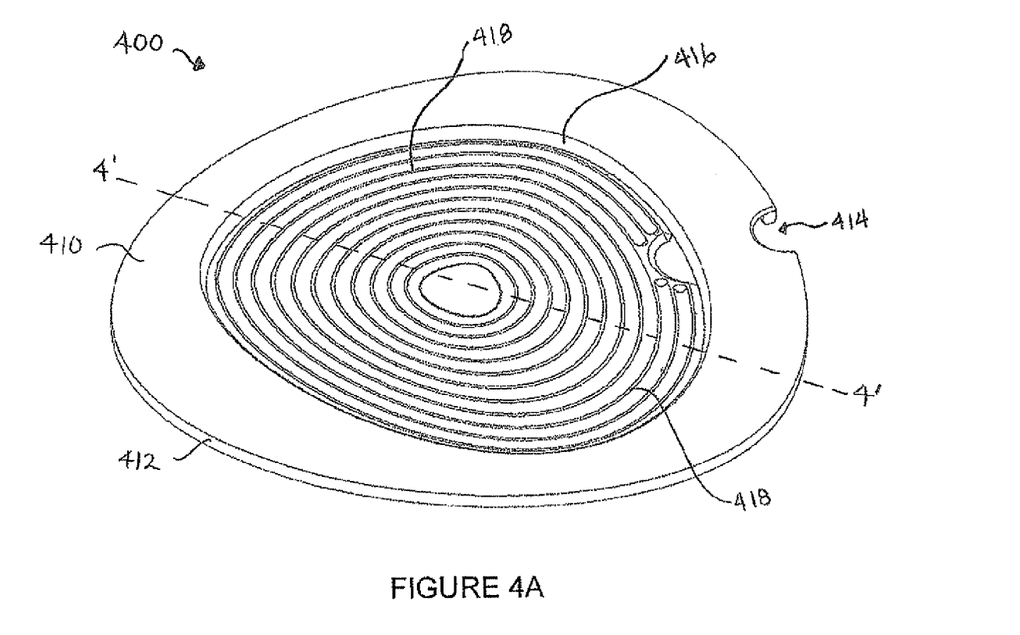
FIG. 4A is a front perspective view of the intermediate insulating pad.
Figure 4B:
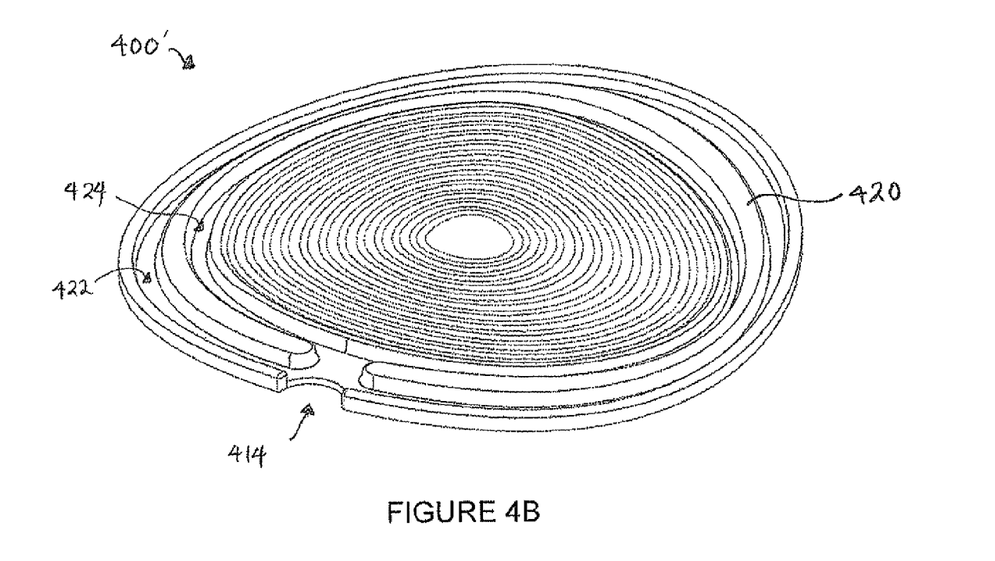
FIG. 4B is a rear perspective view of the intermediate insulating pad.

FIGS. 4A-B shows an embodiment of an intermediate insulating pad (400) that is adapted to be removably coupled to or nested within the recessed support structure (316) of the rigid base (300). As shown in FIGS. 4A-B, the intermediate insulating pad (400) comprises a recessed area (416) comprising a ridged pattern (418). A rim (410) surrounds the recessed area (416) and includes a peripheral wall (412) and a notch (414). As depicted in FIG. 4B, the underside of the intermediate insulating pad (400) optionally includes an inner wall (420) that defines two air channels (422) and (424) around the periphery of the recessed area (416) to provide increased insulation.

Figure 4C:
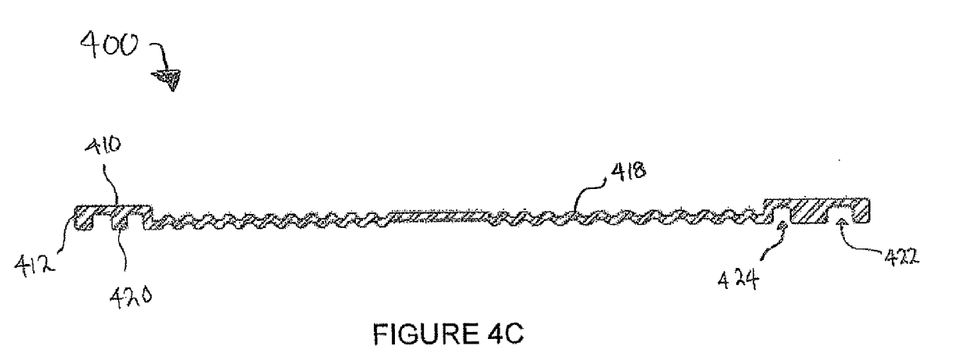
FIG. 4C is a cross-sectional view of the intermediate insulating pad taken along 4'-4' in FIG. 4A.

FIG. 4C is a cross-sectional view of the intermediate insulating pad (400) taken long 4'-4' in FIG. 4A. The ridged pattern (418) is substantially complementary to the ridged pattern (318) of the rigid base (300) so as to permit the mating of the two surfaces when the intermediate insulating pad (400) nests within the recessed support structure (316) of the rigid base (300). In one embodiment, the intermediate insulating pad (400) is made of flexible heat-resistant material, such as heat resistant fabric, heavy-duty Pyrotex®, heat resistant thermoplastics vulcanized rubber (TVR) or silicone. In another embodiment, the intermediate insulating pad (400) could also be made of a rigid material or a combination of a silicone material embedded with a rigid material, similar to the rigid base (300). In another embodiment, the intermediate insulating pad is made of a rigid material.

Figure 5A:
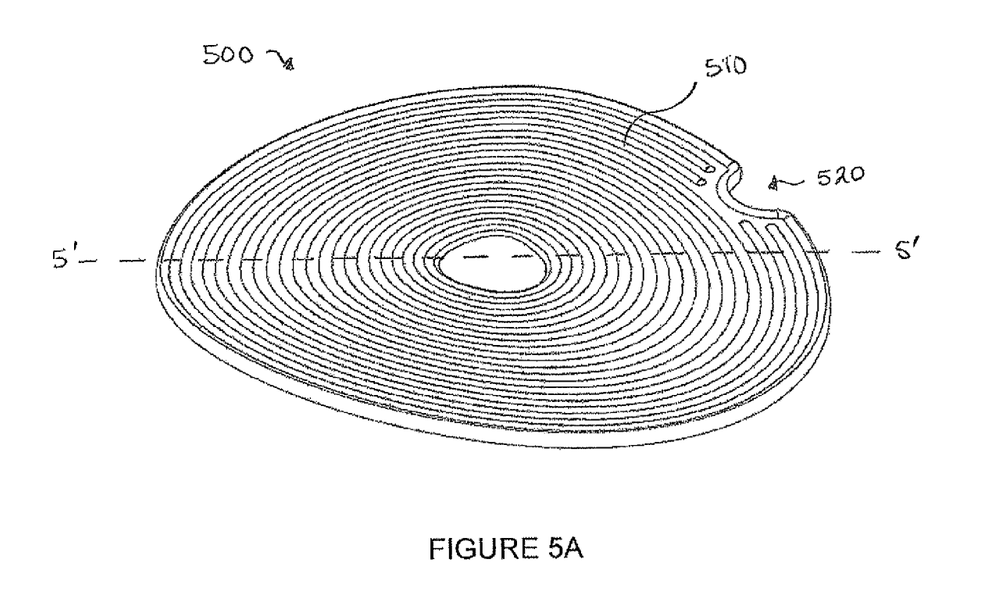
FIG. 5A is a front perspective view of the upper insulating pad.
Figure 5B:
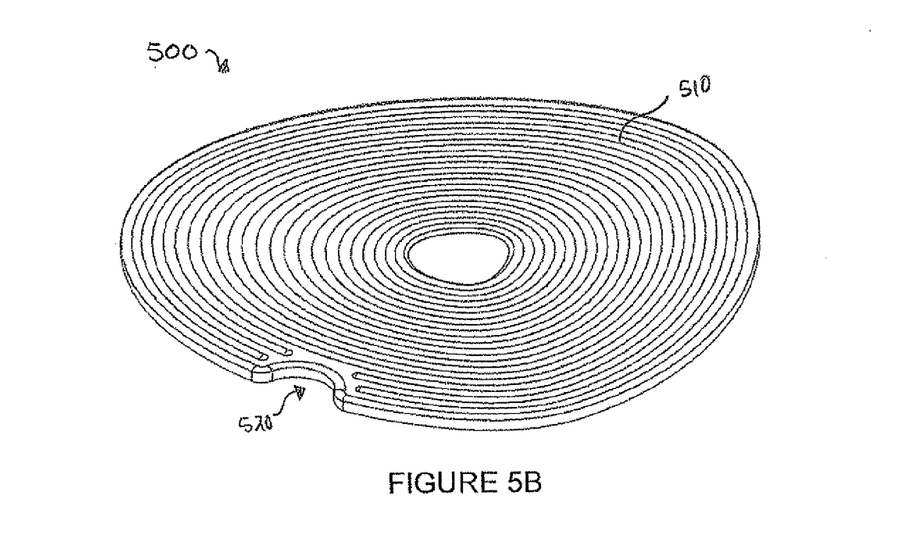
FIG. 5B is a rear perspective view of the upper insulating pad.

FIGS. 5A-B shows an embodiment of the flexible insulating pad (500) that is adapted to be removably coupled to or nested within the recessed area (416) of the intermediate insulating pad (400). The flexible insulating pad (500) comprises a ridged pattern (510) and a notch (520) so as to permit removal of the flexible insulating pad (500) from the intermediate insulating pad (400) when coupled together. The flexible insulating pad (500) is made of flexible heat-resistant material, such as heat resistant fabric, heavy-duty Pyrotex®, heat resistant thermoplastics vulcanized rubber (TVR) or silicone.

Figure 5C:
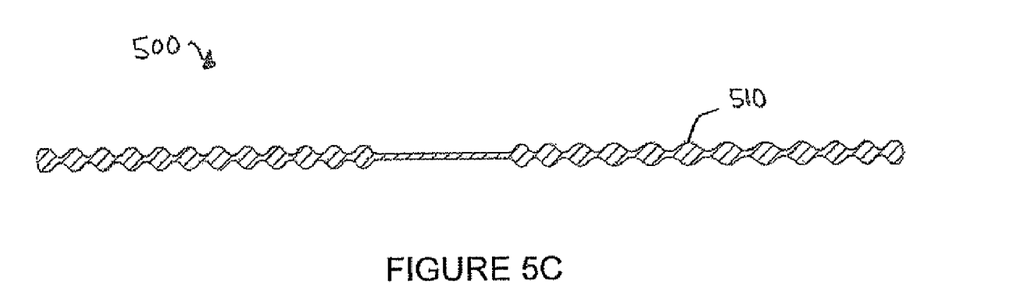
FIG. 5C is a cross-sectional view of the upper insulating pad taken along 5'-5' in FIG. 5A.

FIG. 5C is a cross-sectional view of the upper insulating pad (500) taken along 5'-5' in FIG. 5A showing the ridged pattern (510) that is substantially complementary to the ridged pattern (418) of the intermediate insulating pad (400) so as to permit the mating of the two surfaces when the upper insulating pad (500) nests within the recessed area (416) of the intermediate insulating pad (400).

Although not depicted by the figures, the multi-purpose trivet disclosed herein may further comprise means for removably securing the base and the insulating pads. For example, the base and insulating pads may be removably coupled together by one or more suction cups, magnets, Velcro®, mating engagement elements affixed to the base, the insulating pads, or both. Alternatively, the base and the insulating pads may also be removably coupled together by providing mating surfaces along the periphery of the insulating pads and a corresponding receiving surface along the base. The insulating pad may comprise a convex (or concave) periphery which is designed to mate with and be received within a concave (or convex) area disposed within the base.

Alternatively, the base and insulating pads may be removably coupled together by means of a mating engagement element, wherein the insulating pad comprises a male element disposed on the peripheral edge and the base comprises a corresponding female element disposed on the periphery of the recessed surface to receive the male element when the insulating pad is coupled to the base. In accordance with this embodiment, the male element on the insulating pad may be urged out of and thus disengaged from the female element of the base by biasing the insulating pad away from the base at the notch.

Additionally, the multi-purpose trivet may further comprise at least one LED (not depicted). The at least one LED may be disposed at any location along the rigid base or on the insulating pads. For example, a plurality of LEDs may be provided along the periphery, the center, and/or the rim of the rigid base and/or insulating pads. Moreover, the electronic circuitry and the battery associated with the LED may also be provided in a compartment within the rigid base and/or insulating pads.

It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:
1. A multi-purpose trivet comprising:
   a base comprising a support surface;
   an insulating pad removably coupled to the base, wherein the insulating pad is adapted to be used for gripping hot objects having a temperature of up to about 580° F. when the insulating pad is removed from the base;

wherein the base is rigid and is made substantially of silicone and further comprises a reinforcement material embedded within the base.

2. The multi-purpose trivet of claim 1, wherein the support surface comprises a plurality of ridges for providing an air space for cooling.

3. The multi-purpose trivet of claim 1, wherein the base further comprises a peripheral wall elevating the base to define an air space.

4. The multi-purpose trivet of claim 3, wherein the peripheral wall comprises gaps to permit air to circulate to and from the air space.

5. The multi-purpose trivet of claim 1, wherein the reinforcement material is any one or more selected from the group consisting of wood, high shore silicone, metal, thermoplastic material, thermoset, composite compounds, ceramic, glass, high temperature nylon (Zytel®), and liquid crystal polymer resins (Zenite®).

6. The multi-purpose trivet of claim 5, wherein the reinforcement material is a reinforcement layer that is provided throughout a portion of the base.

7. The multi-purpose trivet of claim 5, wherein the reinforcement material is a reinforcement layer that is provided throughout the entirety of the base.

8. The multi-purpose trivet of claim 1, wherein the insulating pad is flexible.

9. The multi-purpose trivet of claim 8, wherein the insulating pad is made substantially of heat resistant material.

10. The multi-purpose trivet of claim 9, wherein the heat resistant material is any one or more selected from the group consisting of a heat resistant rubber, silicone, high heat TVR, heat resistant fabric, and Pyrotex®.

11. The multi-purpose trivet of claim 9, wherein the insulating pad comprises a plurality of ridges to provide improved gripping in handling hot objects.

12. A multi-purpose trivet comprising:
a rigid base comprising a support surface and a peripheral rim comprising a plurality of spaced apart side walls; and
at least one insulating pad adapted to be removably coupled to the rigid base;
wherein the support surface and the at least one insulating pad comprises matching ridged patterns adapted to securely and removably couple together the rigid base and the at least one flexible insulating pad.

13. The multi-purpose trivet of claim 12 comprising two insulating pads of different sizes, wherein the smaller of the insulating pads is configured to nest within the larger of the insulating pads.

14. The multi-purpose trivet of claim 13, wherein the support surface is recessed from the peripheral rim and shaped to fit the nested insulated pads.

15. The multi-purpose trivet of claim 13, wherein the two insulating pads each further comprise notches to facilitate removal of the flexible insulating pads from each other and from the rigid base.

16. The multi-purpose trivet of claim 13, wherein at least one of the two insulating pads is rigid.

17. The multi-purpose trivet of claim 13, wherein at least one of the two insulating pads is flexible.

18. A multi-purpose trivet comprising:
a rigid base comprising a recessed support surface and a peripheral rim comprising a plurality of spaced apart side walls, wherein the peripheral rim and the plurality of spaced apart side walls define an air space surrounding the support cavity;
an intermediate insulating pad comprising a recessed area, wherein the intermediate insulating pad is configured to fit within the recessed support surface of the rigid base; and
a flexible upper insulating pad configured to fit within the recessed area of the intermediate insulating pad;
wherein the rigid base, the intermediate insulating pad, and the flexible upper insulating pad are removably coupled together to support hot objects; and
wherein the intermediate insulating pad and the flexible upper insulating pad are adapted to be separately used in handling hot objects when removed from the rigid base.

19. The multi-purpose trivet of claim 18, wherein the rigid base is made substantially of silicone and further comprises a reinforcement material embedded within the rigid base.

20. The multi-purpose trivet of claim 19, wherein the reinforcement material is reinforced nylon.

21. The multi-purpose trivet of claim 18, wherein the rigid base is made of ceramic.

22. The multi-purpose trivet of claim 18, wherein the intermediate insulating pad and the flexible upper insulating pad are each made substantially of flexible silicone.

23. The multi-purpose trivet of claim 22, wherein the intermediate insulating pad and the flexible upper insulating pad each further comprise notches to facilitate removal from each other and from the rigid base.

24. The multi-purpose trivet of claim 18, wherein the intermediate insulating pad is made substantially of a rigid material.

* * * * *